(12) United States Patent
Marchetti (10) Patent No.: US 6,503,654 B2
(45) Date of Patent: *Jan. 7, 2003

(54) THIN GRAPHITE BIPOLAR PLATE WITH ASSOCIATED GASKETS AND CARBON CLOTH FLOW-FIELD FOR USE IN AN IONOMER MEMBRANE FUEL CELL

(76) Inventor: George A. Marchetti, 5726 S. Grand, Western Springs, IL (US) 60558

( * ) Notice: Subject to any disclaimer, the term of this patent is extended or adjusted under 35 U.S.C. 154(b) by 0 days.

This patent is subject to a terminal disclaimer.

(21) Appl. No.: 09/886,540

(22) Filed: Jun. 21, 2001

(65) Prior Publication Data

US 2001/0033958 A1 Oct. 25, 2001

Related U.S. Application Data

(63) Continuation-in-part of application No. 09/314,784, filed on May 19, 1999, now Pat. No. 6,284,401.

(51) Int. Cl.[7] .......................... H01M 2/08; H01M 4/86; H01M 4/96; H01M 6/48
(52) U.S. Cl. .......................... 429/35; 429/40; 429/41; 429/210
(58) Field of Search .............................. 429/35, 40, 41, 429/210, 36

(56) References Cited

U.S. PATENT DOCUMENTS

| | | | | |
|---|---|---|---|---|
| 4,044,193 A | * | 8/1977 | Petrow et al. | 429/40 |
| 4,610,938 A | * | 9/1986 | Appleby | 429/42 |
| 5,482,792 A | * | 1/1996 | Faita et al. | 429/30 |
| 5,565,072 A | * | 10/1996 | Faita et al. | 204/256 |
| 5,578,388 A | * | 11/1996 | Faita et al. | 429/26 |
| 5,624,769 A | * | 4/1997 | Li et al. | 429/32 |
| 5,798,187 A | * | 8/1998 | Wilson et al. | 429/210 |
| 5,858,569 A | * | 1/1999 | Meacher et al. | 429/26 |
| 5,945,232 A | * | 8/1999 | Ernst et al. | 429/32 |
| 6,022,634 A | * | 2/2000 | Ramunni et al. | 429/34 |
| 6,037,072 A | * | 3/2000 | Wilson et al. | 429/30 |
| 6,054,228 A | * | 4/2000 | Cisar et al. | 429/18 |
| 6,149,810 A | * | 11/2000 | Gonzalez-Martin et al. | 210/321.84 |
| 6,207,310 B1 | * | 3/2001 | Wilson et al. | 429/210 |
| 6,218,035 B1 | * | 4/2001 | Fuglevand et al. | 429/30 |
| 6,274,262 B1 | * | 8/2001 | Canfield | 429/34 |
| 6,284,401 B1 | * | 9/2001 | Marchetti | 429/210 |
| 2001/0033958 A1 | * | 10/2001 | Marchetti | |
| 2001/0049044 A1 | * | 12/2001 | Molter | |
| 2002/0022173 A1 | * | 2/2002 | Molter et al. | |
| 2002/0031695 A1 | * | 3/2002 | Smotkin | |

FOREIGN PATENT DOCUMENTS

JP          401065776 A   *  3/1989

* cited by examiner

*Primary Examiner*—Tom Dunn
*Assistant Examiner*—Kiley Stoner
(74) *Attorney, Agent, or Firm*—Schwegman, Lundberg, Woessner & Kluth, P.A.

(57) ABSTRACT

The present invention comprises a thin graphite plate with associated gaskets and pieces of carbon cloth that comprise a flow-field. The plate, gaskets and flow-field comprise a "plate and gasket assembly" for use in an ionomer membrane fuel cell, fuel cell stack or battery.

7 Claims, 7 Drawing Sheets

THIN GRAPHITE BIPOLAR PLATE WITH ASSOCIATED GASKETS AND CARBON CLOTH FLOW-FIELD FOR USE IN AN IONOMER MEMBRANE FUEL CELL

This application is a continuation-in-part of U.S. application with Ser. No. 09/314,784, filed May 19, 1999 now U.S. Pat. No. 6,234,401.

This invention was made with government support under Grant No. DE-FG01-97EE15679 from the United States Department of Energy/Energy Related Inventions Program. The government has certain rights in the invention.

FIELD OF THE INVENTION

The present invention relates to electrochemical fuel cells, and more particularly, to ionomer membrane fuel cells.

BACKGROUND ART

A bipolar plate is the backbone of an ionomer membrane fuel cell stack or battery. An ionomer membrane is virtually any ion-conducting membrane. The most technically advanced type of ion-conducting membrane currently available for fuel cell applications is the proton-exchange membrane, such as the Nafion series of membranes, the Dow membrane, etc. The fuel cell electrodes are hot-pressed or otherwise affixed to the membrane to form a unitized assembly. Bipolar plates, and associated gas seals, enclose the membrane and electrode assembly ("MEA") in a fuel cell.

Typical state-of-the-art bipolar plates are made of graphite that is compressed into a single block. Gas flow channels (the "flow-field" channels) are generally machined into the graphite block and permit the flow of the reactant gases from the manifolds and through the flow-field to the electrodes of the fuel cell. Bipolar plates serve three primary functions in overall fuel cell operation. First, they conduct electricity from the fuel side of the electrochemical reaction to the oxidant side of the reaction, where water is produced. Second, they separate the fuel and oxidant gases and prevent cross-mixing of the reactant gases in the cell. Third, they allow gases from the manifolds to reach the appropriate fuel cell electrode. The gas seals or gaskets (the "gaskets") serve to contain the gases within the fuel cell and also prevent cross-mixing of the reactant gases.

Graphite is an excellent material for use in fuel cell applications because it is relatively inert in the corrosive electrochemical environment of the cell. Although the material cost of graphite is not high, the manufacturing methods currently employed result in very costly bipolar plates. Also, because state-of-the-art bipolar graphite plates are compressed into a block, they tend to be relatively thick. A relatively thick plate is also required in order to accommodate the channels of the flow-field. Separate cooling plates are often included in fuel cell designs, which may further add thickness to the fuel cell stack.

As the thickness of the graphite bipolar plates increase, the number of cells that can be placed in a given spatial volume decreases. For example, some state-of-the-art ionomer membrane fuel cells, utilizing a standard machined graphite bipolar plate, may be approximately 100 mils (ca. 2.5 mm) or more thick. Up to ten cells can therefore be stacked per lineal inch of fuel cell stack using these types of cells. If the thickness of the bipolar plate could be reduced, however, much thinner fuel cells could be produced and the cell "stacking density" (i.e., the number of cells in a given volumetric space) could be correspondingly increased. An increase in stacking density would be particularly beneficial in portable and transportation-related applications where more compact and light-weight fuel cell stacks and fuel cell batteries are desirable.

While some work has recently been done in reducing the thickness of the bipolar plate and increasing stacking density, these efforts have focused primarily on the substitution of a metal plate, such as a plate made of titanium, for the traditional graphite bipolar plate. For example, Lynntech, Inc. of College Station, Tex., has reported that its titanium/foamed metal bipolar plate allows stacking densities of up to 5.5 cells per centimeter, or nearly 14 cells per inch. H Power of Belleville, N.J. has developed a bipolar "platelet", also made of titanium, which permits about 12 cells per inch to be stacked. Dr. Mahlon Wilson of Los Alamos National Laboratories has developed a stainless steel screen bipolar plate that allows stacking of about 10 cells per inch.

SUMMARY OF THE INVENTION

One embodiment of the present invention includes a graphite plate because of its proven performance in ionomer membrane fuel cell stacks and its relatively low cost. The term "graphite" as used herein refers to any material which is primarily composed of graphite, including materials composed of graphite, graphite flakes or graphite powders. Unlike state-of-the-art graphite bipolar plates, however, the invention is a thin graphite bipolar plate with associated gaskets for use as a component in an ionomer membrane fuel cell, fuel cell stack or battery. The graphite bipolar plate and gaskets of this invention in certain embodiments are only about 40 mils thick in total. The invention further includes a carbon or graphite cloth ("carbon cloth") flow-field, as hereafter described.

Unlike state-of-the-art graphite bipolar plates, the invention does not have flow-field channels machined into the graphite. Rather, the reactant gases enter the anode and cathode of the fuel cell from the manifolds via "port channels", which are located in the gasket, not in the plate itself. From the port channels, gas then flows into the carbon cloth flow-field, which lies on the first surface of the graphite plate. The second surface of the graphite plate may be smooth, may have a stamped flow-field or may have a carbon cloth flow-field. This structure permits the fabrication of very thin bipolar plate and gasket assemblies.

The unitized plate, carbon cloth flow-field and gaskets of the invention are hereinafter referred to as a plate and gasket assembly ("PGA"). When the MEA is inserted into adjacent PGAs, a fuel cell is fabricated. By assembling multiple ionomer membrane fuel cells in a bipolar arrangement with endplates, a fuel cell stack or battery is fabricated.

Advantages and novel features of the invention will be set forth in part in the description which follows or may be learned by practice of the invention. The advantages of the invention may be realized and attained by mechanisms of the instrumentalities and combinations particularly pointed out in the appended claims.

DETAILED DESCRIPTION OF THE PREFERRED EMBODIMENTS

The present invention comprises a thin graphite bipolar plate with associated gaskets and a carbon cloth flow-field for use as a component in an ionomer membrane fuel cell, fuel cell stack or battery. This invention was made with government support under Grant No. DE-FG01-97EE15679 from the United States Department of Energy/Energy Related Inventions Program. The government has certain rights in the invention.

Figure 1:
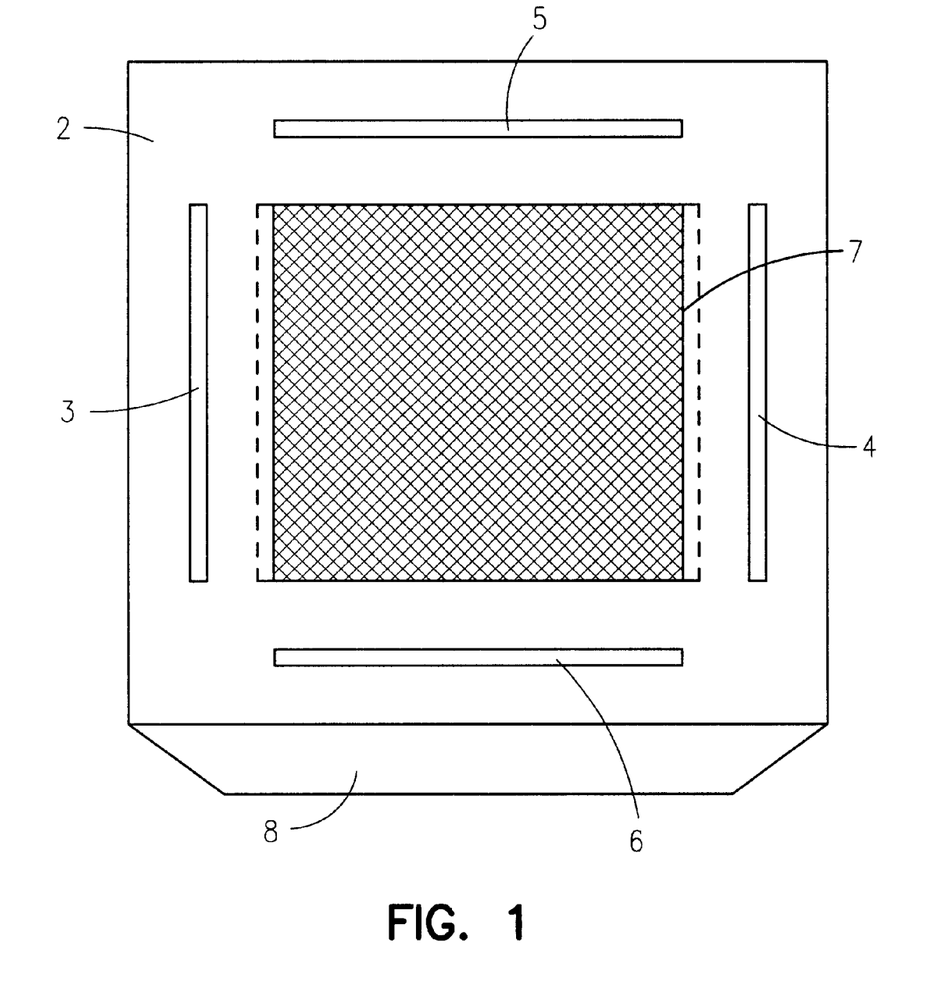
FIG. 1 illustrates a top plan view of a graphite sheet with manifold slots and the carbon cloth flow-field.
Figure 11:
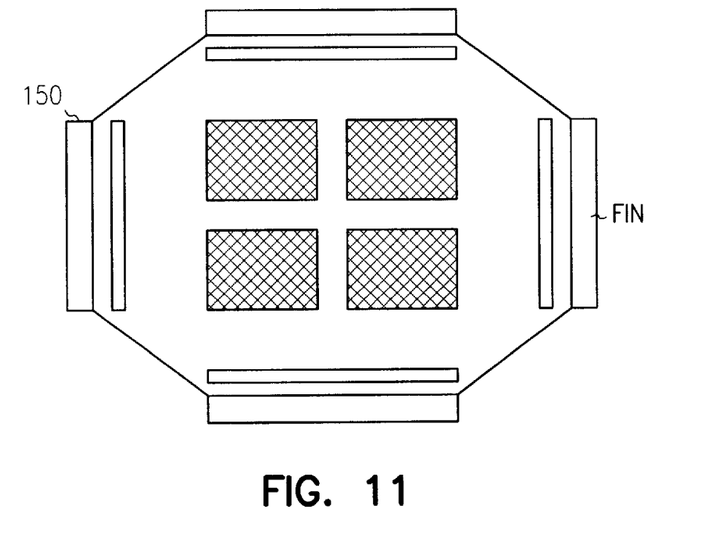
FIG. 11 illustrates another fuel cell embodiment of the present invention.

In one embodiment of the present invention, a graphite sheet 2, such as Alfa Aesar/Johnson Matthey Company of Ward Hill, Mass. Product No. 10832, is cut to the size of the fuel cell as illustrated in FIG. 1. The graphite sheet used in the preferred embodiment is 10 mils thick and has a density of about ca. 1.13 grams per cubic centimeter. The graphite may be first compressed in a rotary press or by other device known to those skilled in the art. Manifolds 3, 4, 5 and 6 are then cut or stamped out of the graphite. Normally, there will be four manifold slots. The slots are for fuel in 3, fuel out 4, oxidant in 5, and oxidant out 6. The fuel may be hydrogen, or ammonia, or a hydrogen-rich gas, methanol, or a mixture of hydrogen and one or more of a hydrogen-rich gas and methanol. The oxidant is oxygen, air, or a mixture of oxygen and air. For a thermal control embodiment, the graphite is extended to form a thermal control fin, if desired, as shown in FIG. 1, or multiple fins as shown in FIG. 11.

Figure 2:
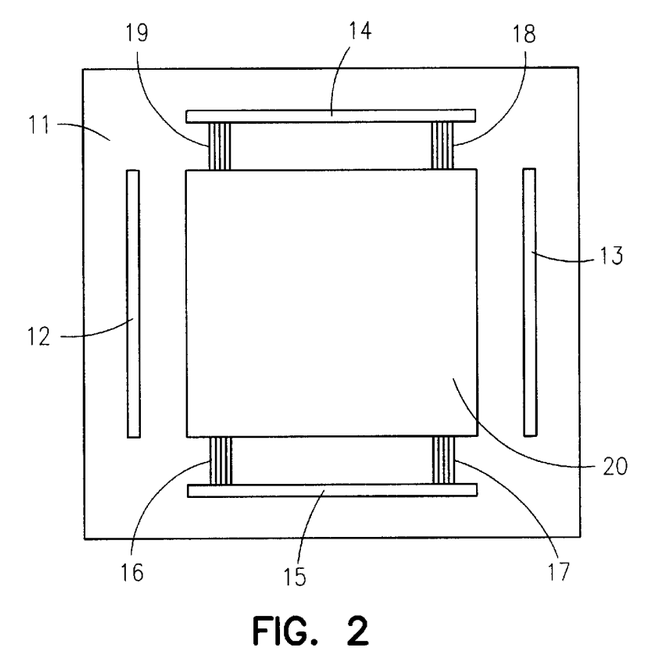
FIGS. 2, 3, 4 and 5 illustrate a top plan view of the port channel side of a four slot gasket.

For the main body of the gaskets, a rigid material is utilized. In some embodiments, the rigid material used is polycarbonate and all such rigid materials that may be used as gaskets in the present invention are hereafter generically referred to, without limitation, as "polycarbonate". Manifolds 12, 13, 14 and 15 are cut or stamped out of the polycarbonate gasket 11 as illustrated in FIG. 2 and the electrode seating area 20 is likewise cut or stamped out. Alternatively, the polycarbonate may be molded to comprise the gasket main body. The polycarbonate may be slightly roughened on both surfaces, if desired. Port channels 16, 17, 18 and 19 are sawed, scored, molded or otherwise impressed into two of the interior legs of each gasket as illustrated in FIG. 2. The port channels can be located in various numbers and at various positions and intervals along the interior legs, as illustrated in FIG. 5.

Figure 3:
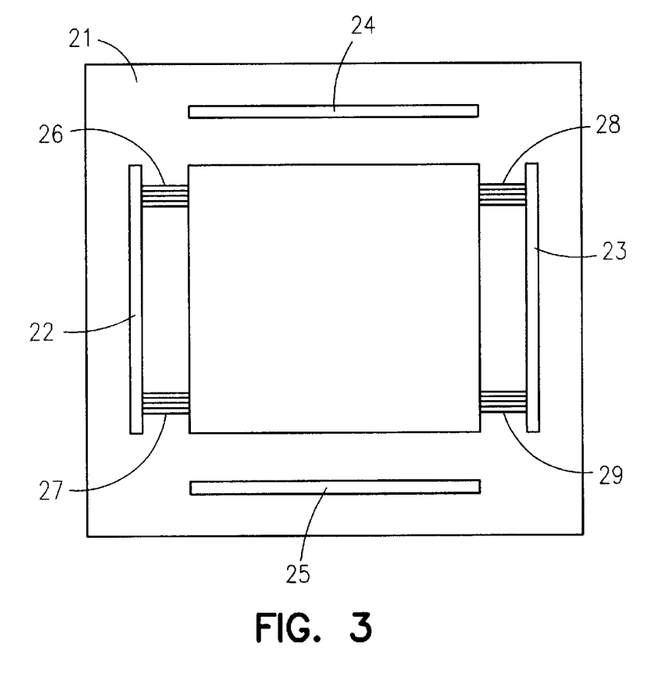

FIG. 3 illustrates the gasket 21 which is placed on the opposite side of the graphite plate from the first gasket 11 and which has port channels 26, 27, 28 and 29 that are rotated 90° with respect to the port channels of the first gasket 11. The manifolds 22, 23, 24 and 25 of the gasket 21 are also illustrated.

Figure 6:
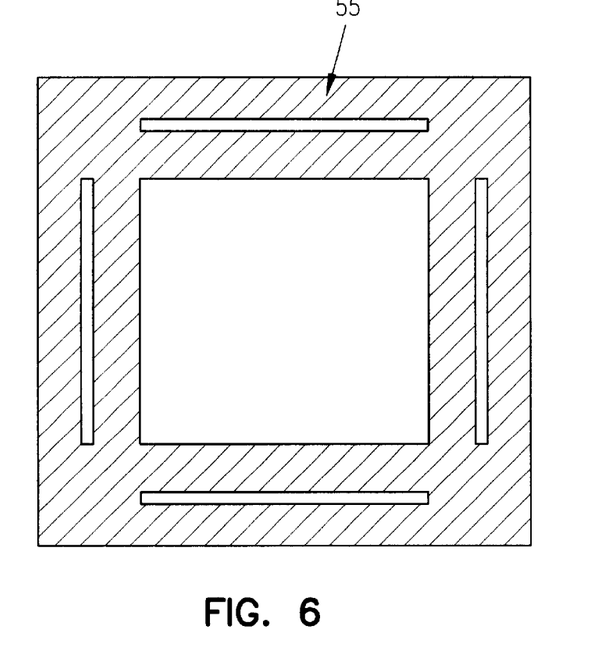
FIG. 6 illustrates a top plan view of the membrane side of a four slot gasket.

To enhance the gas sealing capability of the gasket, a compressible gasket material, such as certain commercially-available automotive silicone gasket materials, is applied to each surface of the gasket main body. The gasket material is applied to the entire surface of the "membrane side" of the gasket, as illustrated in FIG. 6. The "membrane side" of the gasket 55 is that surface of the gasket which is adjacent to the ionomer membrane, as hereinafter described.

Figure 4:
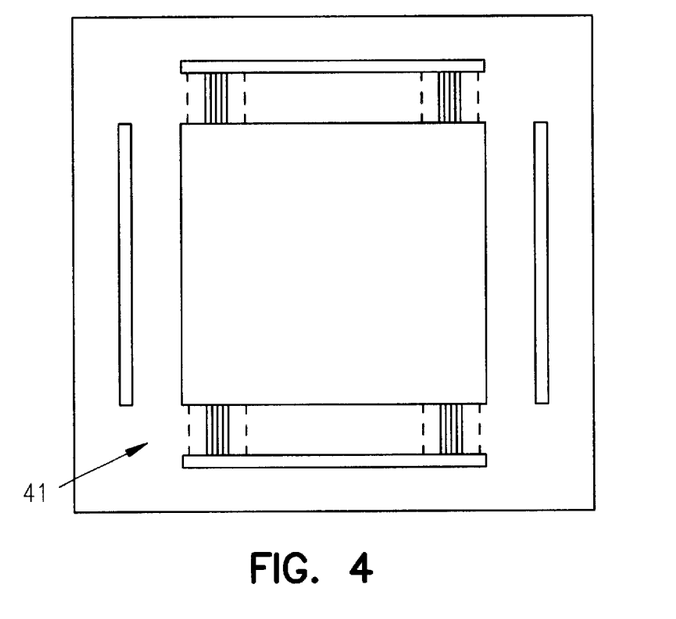
Figure 5:
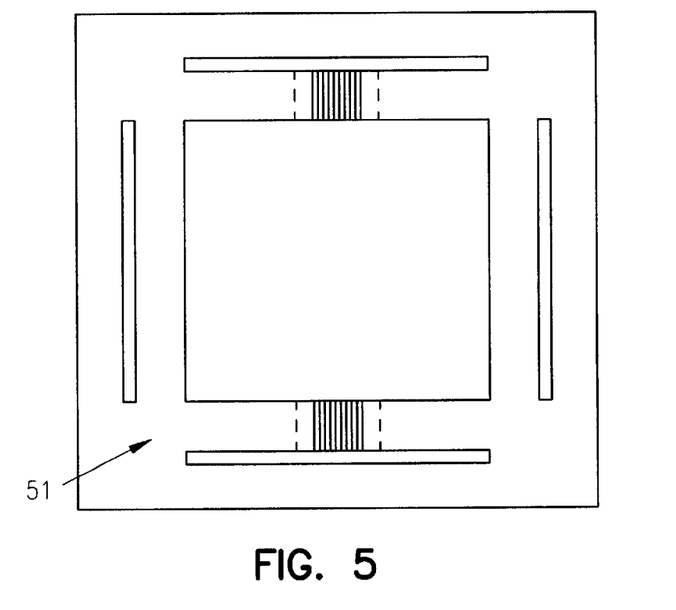

The gasket material is applied only to a portion of the surface of the "plate side" of the gasket 41 and 51, as illustrated in FIGS. 4 and 5. No gasket material is applied in the "port areas" defined by the dotted lines in FIGS. 4 and 5. Consequently, reactant gases from the manifolds enter the electrode seating area of the gasket by means of the port channels in the gasket. The gasket material, however, forms a gas-tight seal with the remainder of the plate and also with the membrane of the MEA, when the MEA is inserted into the PGA.

A piece of carbon cloth 7 is then cut approximately to the size of the electrode seating area as illustrated in FIG. 1. The non-port edges of the carbon cloth and the MEA are sealed and attached to the graphite with gasket material. A slight gap between the carbon cloth and the interior legs of the gaskets where the port channels are located allows for distribution of the reactant gases along the length of the carbon cloth flow-field.

The reactant gases flow through the manifolds and into the port channels of the gasket. See, e.g., FIG. 4. The compressible gasket material on the rigid gasket main body prevents the gases from cross-mixing in the cell. The gases are thereby distributed to the appropriate side of the graphite plate, either the fuel or the oxidant side. The gases then flow into the gap on the first surface of the plate and along the length of the carbon cloth flow field. See, FIG. 1. The gases flow through the carbon cloth and into the appropriate fuel cell electrode. The gases, and the product water formed on the oxidant side of the electrochemical reaction, exit the cell through the carbon cloth, the opposite gap, the opposite port channel and the opposite manifold. Similarly, the other reactant gas is directed through the gasket ports to the second surface of the plate and into the second surface flow-field, which flow-field may be smooth graphite, an impressed flow-field or carbon cloth, depending on the operating condition parameters.

It is understood that the foregoing manifold, port channel and flow-field configuration is illustrative only and that other configurations may be fabricated by those skilled in the art without departing from the spirit and scope of the present invention.

Other embodiments of the present invention may include a thermal control fin 8, or fins, as illustrated in FIGS. 1 and 11. The graphite may be extended beyond the edge of the gasket to form the fins. Adjacent graphite fins may then be separated by an electronic insulating material, such as pieces of anodized aluminum screen, to prevent short circuits between the fins. The thermal control fin permits air or liquid cooling of the fuel cell stack. It should also be noted that the thermal control function also allows the fuel cell stack to be heated in cold weather. By heating the fluid with, for example, a high resistance coil and a chemical battery, heat is transferred into the fuel cell stack via the fins of the graphite sheets.

Figure 7:
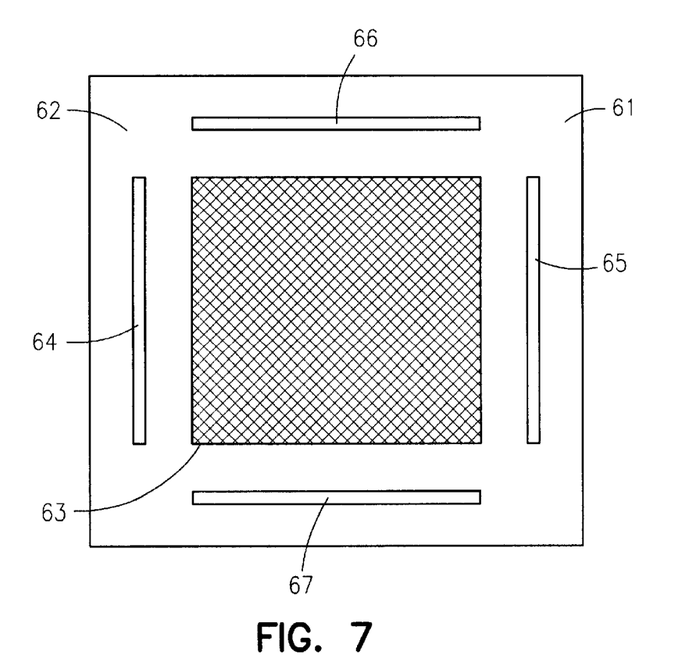
FIG. 7 illustrates a top plan view of a membrane and electrode assembly wherein the electrodes fit into the electrode seating area of the PGA.

Once the PGA has been assembled, the MEA 61 can be inserted in the electrode seating area and sealed along the non-port edge as shown in FIG. 7. The membrane portion 62 of the MEA is substantially the same width and length as the gasket. Slots 64, 65, 66 and 67 are cut in the membrane, which match the slots in the PGA. The fuel cell electrode 63 is also illustrated.

The PGAs may be fabricated to have one of many types of symmetries such as squares, ovals, circles, octagons and so on. Tie rod holes may be drilled in the PGAs or the corners may be clipped to allow tie rod access, as shown in FIG. 11. To continue the fuel cell stack, the next PGA is stacked, the next MEA, etc.

The four-slot PGA illustrated herein is designed for operation on pressurized fuel and oxidant gases. The PGA may be adapted for operation with atmospheric pressure air or in a convection mode by eliminating one or both of internal oxidant manifolds.

The present invention meets the criteria, discussed above, for a thin graphite bipolar plate that is compatible with an ionomer membrane-type MEA in a fuel cell. The graphite plate and gaskets prevent cross-mixing of the reactant gases in the cell. The gases are distributed to the appropriate fuel cell electrode (either fuel or oxidant) by mechanisms of the manifolds, port channels in the gaskets, the first surface carbon cloth flow-field and the second surface flow-field. The graphite sheet and carbon cloth comprise a low-resistance, electronic pathway for the flow of electrons generated by the electrochemical reaction in a bipolar configuration. The carbon cloth serves not only as a flow-field but also as a soft, spring-type electronic contact within each cell. Thermal control may be achieved by a mechanism of the thermal conductivity of the graphite fins.

Moreover, one embodiment of the present invention is comprised of relatively inexpensive precursor materials: graphite sheet, a rigid material such as polycarbonate or other suitable high-temperature polymer, or metal that can be stamped or molded, gasket material, and carbon cloth. No machining is employed. All of the component parts of the bipolar plate and associated gaskets can be stamped or molded or cut, thereby enabling the potential reduction of manufacturing costs.

The present invention further increases the cell stacking density of ionomer membrane fuel cells beyond that currently possible with state-of-the-art bipolar plates. About sixteen or more cells per lineal inch can be stacked using the present invention. The component or precursor materials are relatively inexpensive and light-weight in order to minimize the cost and weight of the invention.

Figure 8:
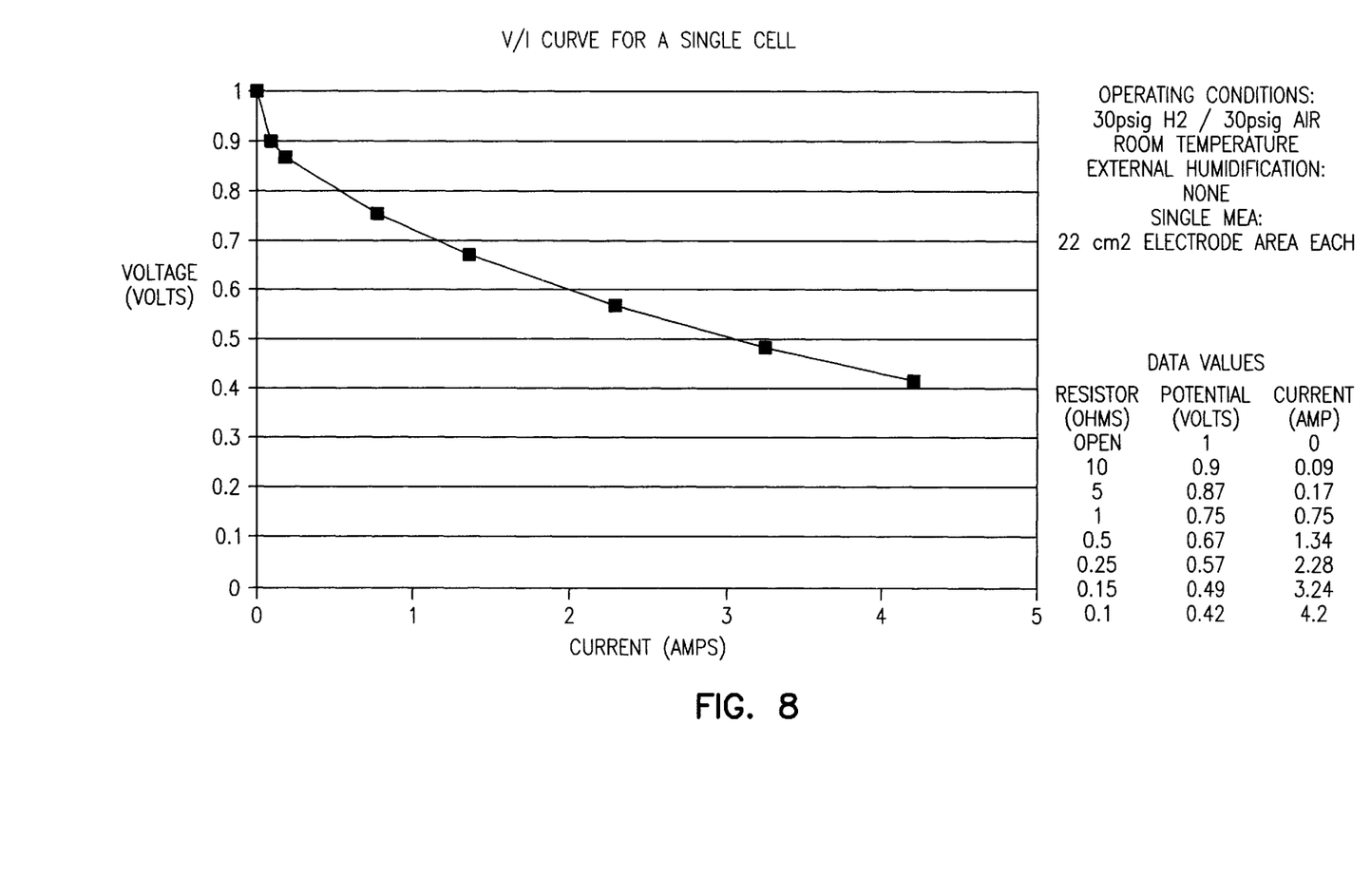
FIG. 8 illustrates a graphical view of a V/I curve for a single cell.
Figure 9:
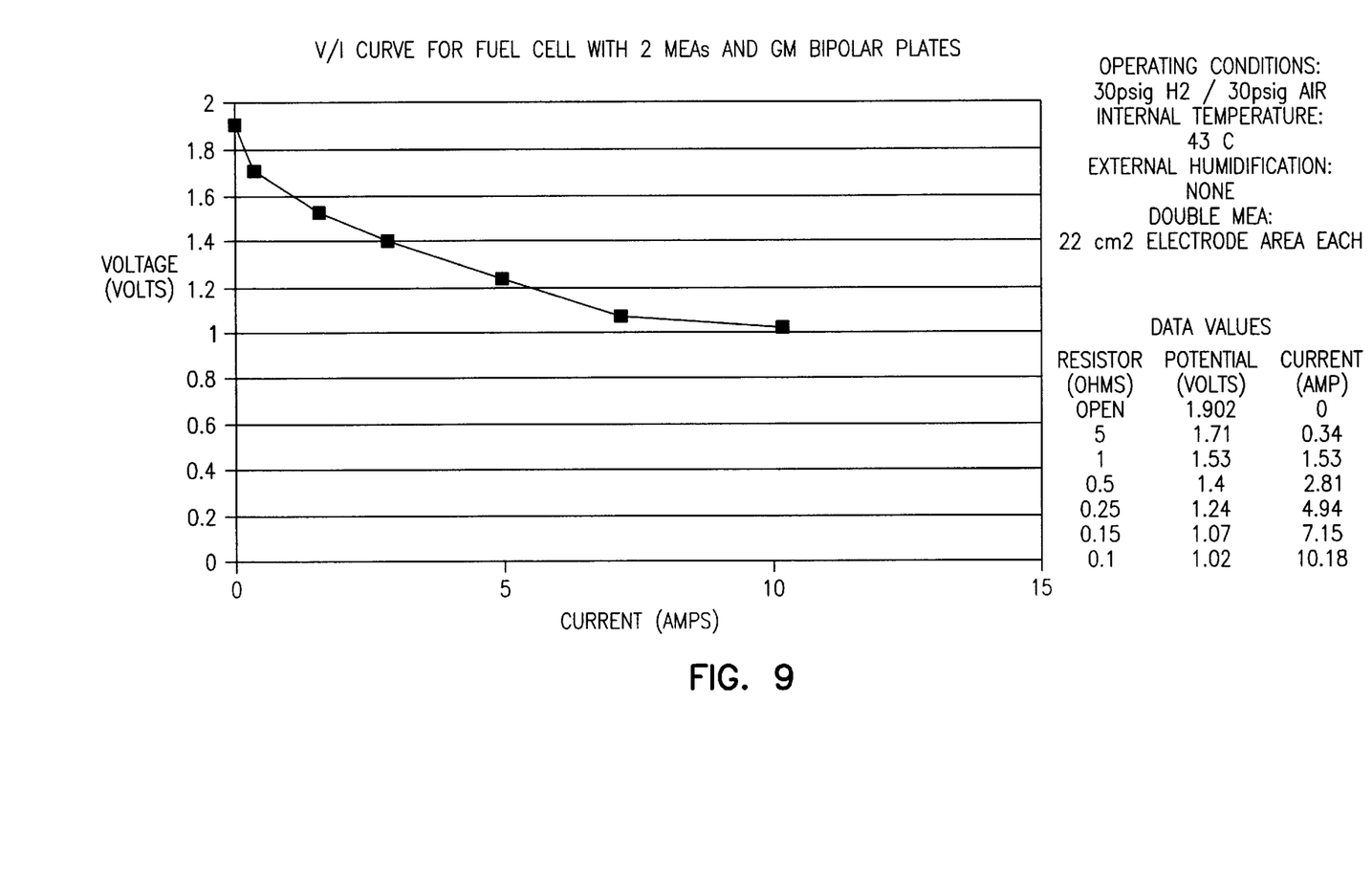
FIG. 9 illustrates a graphical view of a V/I curve for a fuel cell with 2 MEAs and a bipolar plate.

FIG. 8 illustrates the representative performance of a single-cell fuel cell unit, using an MEA manufactured by BCS Technology of Bryan, Tex. FIG. 9 illustrates the representative performance of a two-cell unit which includes one of the embodiments of the PGA of the present invention, i.e., a non-fin embodiment with a smooth graphite surface on the fuel side of the PGA. The heat produced by the electrochemical fuel cell reaction is used in this particular non-fin, two-cell embodiment to increase internal cell temperature, which, in turn, increases the power generated by each of the cells. A comparison of FIGS. 8 and 9 indicates that both the voltage and amperage of the two-cell unit are approximately twice that of the one-cell unit, with an incremental increase in the two-cell unit being attributable to higher operating temperature. This comparison indicates that the PGA thus provides a relatively low-resistance electronic connection between the cells, adequately supplies reactant gases to the MEAs and allows for removal of depleted oxidant and product water produced by the cells.

Figure 10:
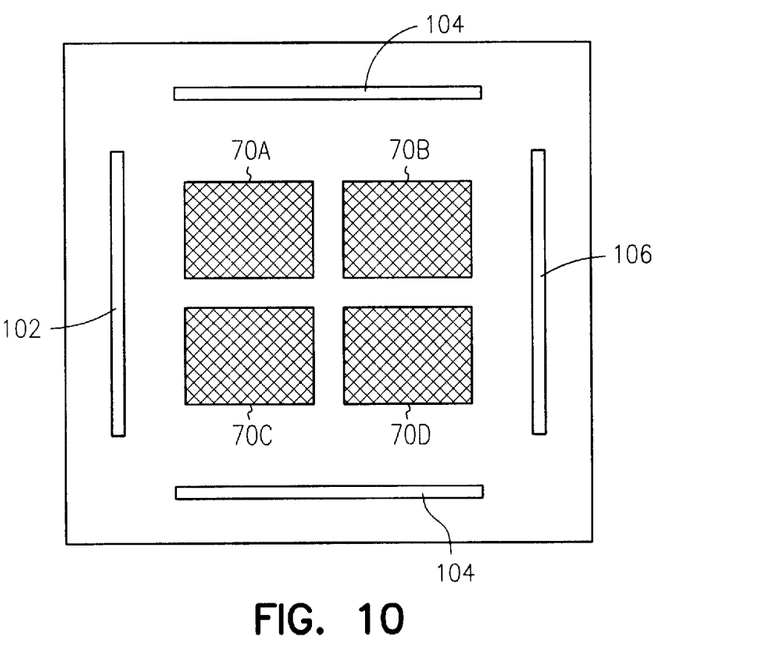
FIG. 10 illustrates one other fuel cell embodiment of the present invention.

In one other fuel cell embodiment, illustrated at 100 in FIG. 10, a carbon cloth flow-field includes two or more pieces of carbon cloth 70A, 70B, 70C, and 70D, shown in FIG. 10, with one or more gas flow channels positioned between or around the individual carbon cloth pieces. The channels 102, 104 and 106 permit ready gas flow through the flow-field. The channels 102, 104 and 106 also permit gas flow into the pieces of carbon cloth.

Reactant gases flow either directly from the channels 102, 104 and 106 into the carbon cloth pieces 70A, 70B, 70C and 70D, adjacent to the channels and then into a backing of the fuel cell electrodes. The carbon cloth pieces 70A-D are tacked to either the fuel cell electrode backing and/or the graphite plate with one or more dots of an adhesive material, which as not shown, such as a silicone gasket material. Other flow-field patterns known to those skilled in the art, such as interdigitated patterns, are also possible using the channel/carbon cloth configurations described herein. The foregoing description is not intended as a limitation upon patterns or configurations which could be fabricated from the carbon cloth flow-field claimed herein.

In another fuel cell manufacturing embodiment, prior to assembly, a graphite plate is pressed between two pieces of carbon cloth in a rotary press or similar device. Each piece of carbon cloth is approximately the size of an electrode seating area. The pressing step delineates the electrode seating area for subsequent processing.

In one other embodiment, the corners of the graphite, the rigid/compressible gasket and the membrane are clipped at an angle in order to permit points of access for the tie-rods, which secure the fuel cell stack between the endplates. Clipping the corners decreases the likelihood of an unintended short-circuit, which could occur if a metal tie-rod were to touch one or more of the graphite plates of the invention.

The foregoing description of the invention has been presented for purposes of illustration and description and is not intended to be exhaustive or to limit the invention to the precise form disclosed and obviously many modifications and variations are possible in light of the above teaching. The embodiments were chosen and described in order to best explain the principles of the invention in various embodiments and with various modifications as are suited to the particular use contemplated. It is intended that the scope of the invention be defined by the claims appended hereto.

What is claimed is:

1. A bipolar plate and gasket assembly (a "PGA"), comprising:

a graphite sheet;

rigid gasket main body or bodies;

compressible gasket material; and two or more pieces of carbon cloth and one or more gas flow channels positioned between or around the pieces of carbon cloth.

2. The bipolar plate of claim 1 and further including a thermal control fin or fins.

3. The bipolar plate of claims 1 and 2 and further including a fuel cell membrane and electrode assembly in which slots are cut or stamped or otherwise made in the membrane corresponding to the manifolds formed by the PGA.

4. The bipolar plate of claim 1 wherein the gas flow channels in the carbon cloth flow-fields are interdigitated.

5. The bipolar plate of claim 1 further comprising a fuel cell electrode wherein the pieces of carbon cloth are attached to the fuel cell electrode with adhesive.

6. The bipolar plate of claim 5 wherein the adheisve is a silicone gasket material.

7. A fuel cell comprising a bipolar plate comprising a graphite portion and a carbon cloth flow-field, or flow-fields, which is adjacent to and in contact with the graphite portion of a bipolar plate, comprising pieces of carbon cloth within one plane and one or more gas flow channels positioned between or around the pieces of carbon cloth.

* * * * *

UNITED STATES PATENT AND TRADEMARK OFFICE
CERTIFICATE OF CORRECTION

PATENT NO. : 6,503,654 B2
DATED : January 7, 2003
INVENTOR(S) : George A. Marchetti

It is certified that error appears in the above-identified patent and that said Letters Patent is hereby corrected as shown below:

<u>Title page,</u>
Item [56], insert -- OTHER PUBLICATIONS -- above
"2001/0033958 A1 * 10/2001 Marchetti".

<u>Column 6,</u>
Line 61, delete "flow-fields" and insert -- flow fields -- therefor.

Signed and Sealed this

Nineteenth Day of August, 2003

JAMES E. ROGAN
*Director of the United States Patent and Trademark Office*